(12) United States Patent
O'Kelley et al.

(10) Patent No.: US 8,538,808 B2
(45) Date of Patent: Sep. 17, 2013

(54) CREATIVE AUDIT SYSTEM

(75) Inventors: Charles Brian O'Kelley, New York, NY (US); Michael Teplitsky, Moscow (RS); Michiel Nolet, New York, NY (US)

(73) Assignee: Yahoo! Inc., Sunnyvale, CA (US)

( * ) Notice: Subject to any disclaimer, the term of this patent is extended or adjusted under 35 U.S.C. 154(b) by 836 days.

(21) Appl. No.: 11/610,699

(22) Filed: Dec. 14, 2006

(65) Prior Publication Data

US 2008/0147682 A1    Jun. 19, 2008

(51) Int. Cl.
*G06Q 30/00* (2012.01)

(52) U.S. Cl.
USPC .......... 705/14.4; 705/14.73; 707/690; 726/25

(58) Field of Classification Search
USPC ....................................................... 705/14.4
See application file for complete search history.

(56) References Cited

U.S. PATENT DOCUMENTS

| | | | |
|---|---|---|---|
| 5,999,912 A * | 12/1999 | Wodarz et al. | 705/14.61 |
| 6,895,387 B1 * | 5/2005 | Roberts et al. | 705/14.47 |
| 7,085,732 B2 | 8/2006 | Gould | 705/14 |
| 2002/0010775 A1 * | 1/2002 | Rakavy et al. | 709/224 |
| 2002/0147645 A1 * | 10/2002 | Alao et al. | 705/14 |
| 2004/0078292 A1 * | 4/2004 | Blumenau | 705/27 |
| 2004/0186778 A1 * | 9/2004 | Margiloff et al. | 705/14 |
| 2007/0055748 A1 * | 3/2007 | Kim et al. | 709/219 |

* cited by examiner

*Primary Examiner* — John Van Bramer
*Assistant Examiner* — Stacie Gatling
(74) *Attorney, Agent, or Firm* — Nathan O. Greene; Brinks Hofer Gilson & Lione (57) ABSTRACT

A method for testing a candidate creative by inspecting a technical attribute of the candidate creative; determining that the candidate creative is a fixed creative; classifying the candidate creative according to a content attribute thereof; and queuing the candidate creative for re-inspection of the technical attribute.

27 Claims, 6 Drawing Sheets

CREATIVE AUDIT SYSTEM

FIELD OF DISCLOSURE

This disclosure relates to content delivery, and in particular, to distribution of creatives.

BACKGROUND

Computer networks generally, and the internet in particular, have evolved into a medium for carrying content from content publishers to content consumers. Such content often includes third-party content, such as advertisements and public service announcements.

A variety of third-party content vectors, or vehicles, are available for carrying third-party content to content consumers. One common third-party content vector is a web page, which typically has slots into which advertisements, or other third-party content, can be loaded. However, many other third-party content vectors are available for distributing advertisements over the internet. For example, one can embed, or include advertising content in video games, web pages, desktop application, movies, and the like, all of which can be distributed using a computer network.

A typical third-party content vector, particularly one maintained by a commercial web publisher, includes both content of interest to a user, and blank slots for receiving advertisements, also known as "creatives," that advertisers hope will be of at least some interest to the user. The web publisher sells these slots to advertisers, who then populate them with creatives. Each creative, when exposed to a user, results in an "impression." The advertiser generally pays the web publisher on the basis of a number of impressions. Third-party content vectors that carry third-party content in the form of creatives will be referred to herein as "creative vectors."

When a user opens a creative vector, the slots are re-filled with creatives. This means that the creative in a particular slot can easily change from one instance of the creative vector to another. To the extent any information about the user may be available at the time the creative vector is assembled, the creatives can be selected to target a particular user, and the cost of the impression can be adjusted to reflect its expected value.

It is apparent therefore that each time a user opens a creative vector, several events occur for each slot. These events include the ascertainment of a suitable price for the slot, the collection of information for ensuring the advertiser's payment for the slot, and the placement of the creative into the slot.

SUMMARY

The invention is directed toward the last step of the foregoing process, namely delivery of the creative to the publisher.

In one aspect, the invention includes a method for testing a candidate creative by inspecting a technical attribute of the candidate creative; determining that the candidate creative is a fixed creative; classifying the candidate creative according to a content attribute thereof; and queuing the candidate creative for re-inspection of the technical attribute.

In some practices, the method also includes authorizing the candidate creative for release.

In other practices, inspecting a technical attribute includes generating a creative vector containing the creative; launching a browser; and loading the creative vector into the browser. In some such practices, inspecting a technical attribute further includes providing a proxy-server for communication with the browser, and/or causing a browser to load a web page that includes a creative.

In another aspect, the invention includes a method for testing a candidate creative by inspecting a technical attribute of the candidate creative; determining that the candidate creative is a mutable creative; and queuing the candidate creative for re-inspection of the technical attribute.

In some practices, inspecting a technical attribute includes causing a browser to load a web page that includes a creative; and detecting an interaction between the creative and the browser. A variety of interactions can be detected. Examples include, but are not limited to, detecting an attempt to alter a state of a window associated with the browser, detecting an interaction includes detecting an attempt to cause the browser to open a window, and detecting an interaction includes detecting a new window.

In some practices, inspecting an attribute includes determining that the creative includes an instruction to reference a file; determining a property associated with the file; and providing information indicative of the property. Determining a property can include, for example, determining a type of the file, and/or determining a size of the file.

Other practices include those in which queuing the candidate creative includes placing the candidate creative one an endless queue for repeated re-inspection, those in with queuing the candidate creative includes placing the candidate creative on both a low-priority queue and on a high-priority queue, and those in which placing the candidate creative on a low-priority queue includes placing the candidate creative on an endless queue.

In another aspect, the invention includes a computer-readable medium having encoded thereon software for testing a candidate creative, the software including instructions for carrying out any of the foregoing methods.

In another aspect, the invention includes a data-processing system for testing candidate creatives, the system including processing subsystem; a memory subsystem in data communication with the processing subsystem; and a storage subsystem in data communication with the processing subsystem and the memory subsystem, the storage subsystem having encoded thereon software for inspecting a technical attribute of the candidate creative; determining that the candidate creative is a mutable creative; and queuing the candidate creative for re-inspection of the technical attribute.

In another aspect, the invention includes a data-processing system for testing candidate creatives, the system including a processing subsystem; a memory subsystem in data communication with the processing subsystem; and a storage subsystem in data communication with the processing subsystem and the memory subsystem, the storage subsystem having encoded thereon software for defining a queue for holding creatives; implementing a technical audit system for inspecting technical attributes of creatives; and implementing a content audit system for receiving fixed creatives from the technical audit system.

In another aspect, the invention includes a data-processing system for testing candidate creatives, the system including a processing subsystem; a memory subsystem in data communication with the processing subsystem; and a storage subsystem in data communication with the processing subsystem and the memory subsystem, the storage subsystem having encoded thereon software for inspecting a technical attribute of the candidate creative; determining that the candidate creative is a fixed creative; classifying the candidate creative according to a content attribute thereof; and queuing the candidate creative for re-inspection of the technical attribute.

DETAILED DESCRIPTION

Figure 1:
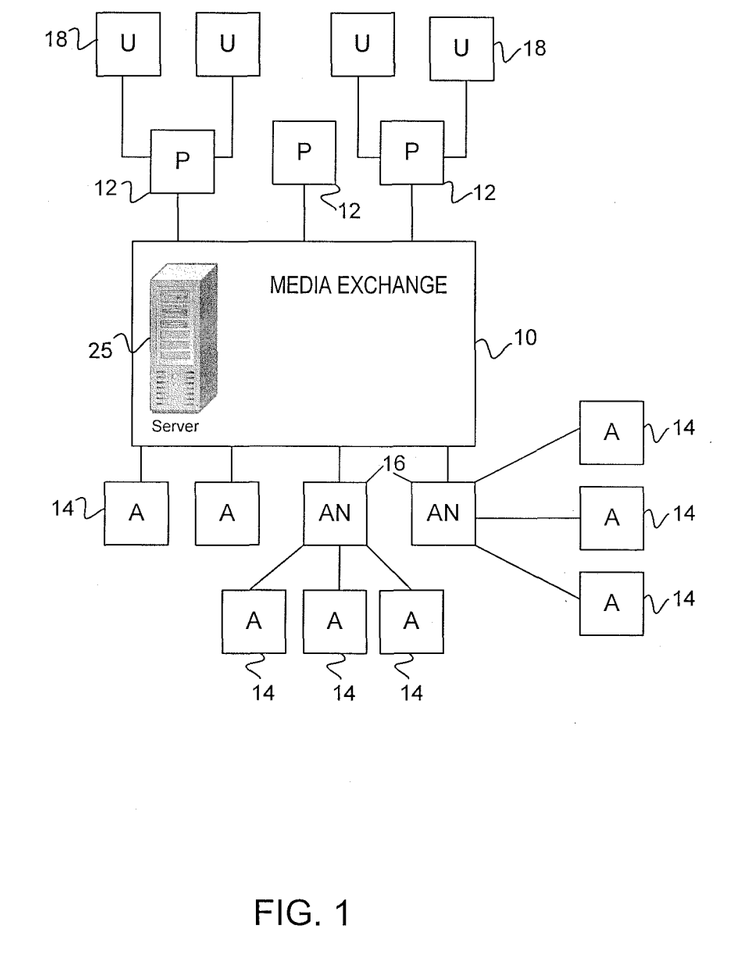
FIG. 1 shows a media exchange for distribution of creatives.

A media exchange 10, as shown in FIG. 1, brings together prospective buyers and sellers of creatives. In particular, the media exchange 10 provides a common data communication platform for publishers 12, who distribute creatives to users 18, and the suppliers of those creatives, namely advertisers 14 and advertising networks 16, with the latter functioning as brokers for additional advertisers 14. The publishers 12 are in intermittent data communication with users 18.

In operation, when a user 18 opens a creative vector maintained by a publisher 12, the publisher 12 sends a message to the media exchange 10 to draw attention to an imminent opportunity to make an impression on the user 18. Optionally, the publisher 12 makes available information concerning the user 18. Such information may include, for example, demographic information, such as age, gender, location, occupation, and the like. The publisher 12 also makes available information about the available slot, for example its size and shape, its location on the page, and the existence of other slots that may compete for the user's attention.

As used herein, a creative vector is any object into which one might associate third-party content for distribution over a computer network. Examples of creative vectors include web pages, desktop applications, movies, video games, and the like. The third-party content is often advertising content. However, the system disclosed herein is not restricted in any way by the nature of the third-party content.

Each advertiser 14 (which as use herein includes the advertising networks 16) then determines if the impression opportunity is of interest, and if so, which creative might profitably exploit that opportunity. The advertiser 14 then bids for the right to make the impression. Other advertisers 14 may also bid for the same right. Eventually, the bidding closes, the creative associated with the highest bid is delivered to the waiting publisher 12, inserted into the appropriate slot, and viewed by the targeted user 18.

The exchange of creatives includes additional restrictions that are dictated by both the advertisers 14 and publishers 12. These restrictions relate to both the technical attributes of the creative and the commercial impression made by the display of particular content by a particular publisher 12.

For example, many advertisers 14 prefer to avoid displaying certain creatives with particular publishers 12. For example, an advertiser 14 may not wish to show a creative on a pornographic site, or at a site that would otherwise provide a basis for disparaging the advertiser 14 or its product. Conversely, certain publishers may wish to avoid displaying creatives with certain content attributes, such as creatives for selling cigarettes or liquor, or creatives having lewd or suggestive content.

In addition, certain publisher 12 prefer to avoid creatives having certain technical attributes. For example, certain publishers 12 may want their creative vectors to load quickly. To achieve this, they may impose restrictions on the size of the creative. Other publishers 12 may want to avoid certain kinds of intrusive animation, or audio.

Figure 2:
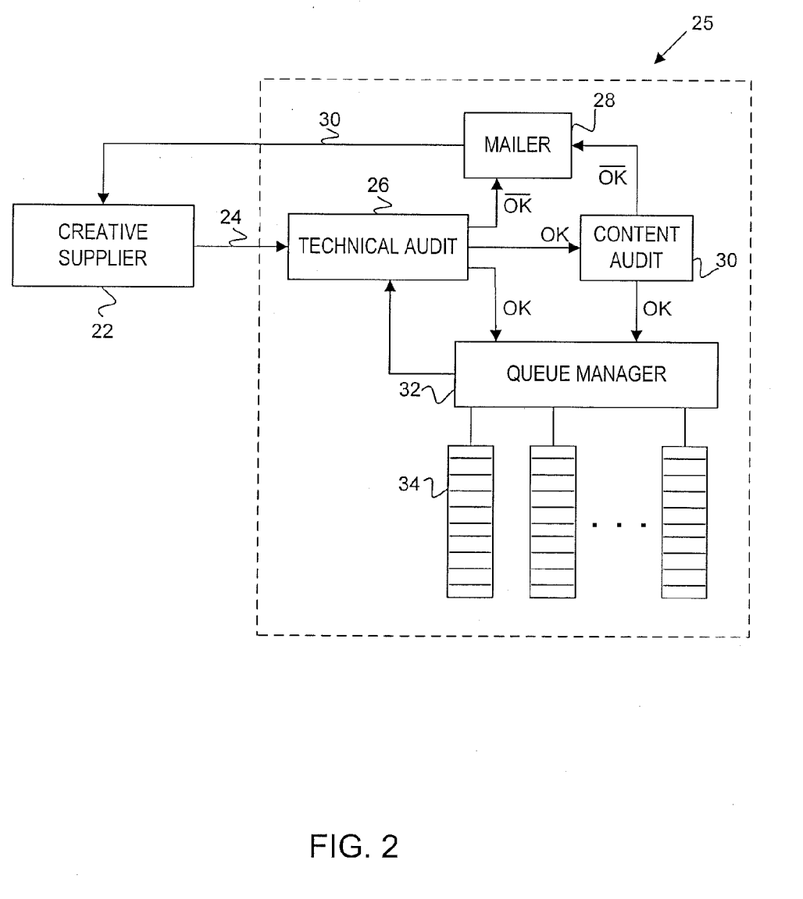
FIG. 2 shows a creative audit system for auditing creatives obtained from the media exchange of FIG. 1.

To assist publishers 12 in controlling the distribution of creatives on their creative vectors, a creative audit system, shown in FIG. 2, repeatedly tests creatives supplied by a creative supplier 22.

Each creative can be viewed as having two sets of attributes: its "content attributes," which reflect what a user 18 sees, and its "technical attributes," which reflect what a computer "sees." Thus, the "content attributes" can be viewed as indicative of the creative's interaction with existing content in the mind of a user 18, and the "technical attributes" can be viewed as indicative of the creative's interaction with existing software executing on the user's computer system.

The distinction between a content attribute and a technical attribute is analogous to the well-known distinction between medium and message.

For example, a roll of film may have technical attributes, such as whether the film is 35 mm or 120 mm, whether it has sprocket holes, and if so, what shape, size and pitch, whether the images are to be square or rectangular, and if so, at what aspect ratio, whether the film is a high speed film or not, and so on.

A roll of film may also have content attributes. For example, one roll of film may be filled with family photos. Another roll, with identical technical attributes, may be filled with pictures of stars and planets. In such a case, both rolls have the same technical attributes because both rolls would interact with the camera in the same way. But the rolls would have different content attributes.

As shown in FIG. 2, a creative supplier 22 provides a candidate creative 24 to a technical audit system 26, the details of which are discussed in connection with FIG. 3. The technical audit system 26 examines selected technical attributes of the candidate creative 24. Examples of technical attributes include whether the candidate creative 24 attempts to install other software, whether it attempts to resize a browser window, whether it carries a virus, and whether its size exceeds a particular threshold.

Among the technical attributes that the technical audit system 26 tests are:
  attempts to install software, for example using an Active-X installer,
  the presence of virus executable files, the presence of spyware,
  excessive file sizes,
  excessive download times,
  blank regions,
  rotating advertisements,
  unexpected window behavior, including re-sizing, hiding, banner pops, multiple pops, or exit pops,
  obtrusive animation, and
  embedded audio.

The technical audit system 26 thus includes software for detecting JavaScript warnings, detecting new windows, including unexpected pop-ups, storing and displaying all data from each hop, for analyzing content and behavior across multiple tests of that creative, and for detecting and flagging any creatives that have user-specified URLs or text matches.

In some cases, the technical audit system 26 determines that the technical attributes of the candidate creative 24 render the creative unsuitable for publication. Under these circumstances, the technical audit system 26 transmits, to a mailer 28, rejection information indicative of the nature of the unsuitability. On the basis of the rejection information, the mailer 28 sends a rejection message 30 to the creative supplier 22.

In other cases, the technical audit system 26 determines that the technical attributes of the candidate creative 24 pose no barrier for publication. Under these circumstances, the next step depends on whether the creative is "fixed" or "mutable".

A "fixed" creative is one whose constituent elements do not change each time the creative vector is re-loaded into a browser. Fixed creatives are likely to be those under the control of the media exchange 10. Such creatives would have all their constituents stored on a media-exchange server 25. When this is the case, the creative is served to the publisher 12 directly from the media-exchange server 25. Fixed creative may originate from an advertising agency server that points to a reliable third party location.

In contrast, a "mutable" creative is one whose constituent elements may change each time a creative vector is re-loaded into a browser. Mutable creatives often arise when, for example, a creative includes pointers to constituent elements that are stored at locations other than the media-exchange server 25. Such constituent elements can readily be changed.

If a candidate creative 24 is a fixed creative, the technical audit system 26 makes it available to a content audit system 30. The content audit system 30 classifies the creative according to its content attributes.

In the present implementation, operation of a content audit system 30 includes participation of a human editor who inspects the content of the candidate creative 24 to determine its content attributes. Then, the human editor classifies the candidate creative 24 according to its content attributes. In some cases, a second human editor also inspects the content of the candidate creative 24 to provide a check on the judgment of the first human editor. A publisher 12 can then indicate those classifications it is willing to accept. This ensures that only creatives with approved content attributes are routed to a particular publisher 12.

As an alternative to relying on human judgment, one could instead incorporate into the content audit system 30 a system for automatically determining the content attributes of a candidate creative 24 without human judgment.

In some cases, the content audit system 30 determines that the content attributes of the candidate creative 24 render the creative unsuitable for publication. Under these circumstances, the content audit system 30 transmits, to the mailer 28, rejection information indicative of the nature of the unsuitability. On the basis of the rejection information, the mailer 28 sends a rejection message 30 to the creative supplier 22.

In other cases, the content audit system 30 determines that the content attributes of the candidate creative 24 pose no barrier for publication. Under these circumstances, the content audit system 30 submits the creative to a queue manager 32, the operation of which will be discussed below.

In some embodiments, the content audit system 30 sets a flag associated with the creative to indicated that it has already been screened by the content audit system 30. Such a flag prevents the content audit system 30 from inspecting a fixed creative more than once. If, during a subsequent re-inspection the technical audit system 26 detects a change in the creative, this flag is cleared so that the creative can again pass through the content audit system 30.

In the case of an mutable creative, the content that would be inspected by the content audit system 30 may change easily. Hence, there is little benefit in submitting the creative to the content audit system 30 at all. Thus, once the technical audit system 26 determines that a candidate creative 24 is a mutable creative, it bypasses the content audit system 30 altogether and submits the creative directly to the queue manager 32.

As discussed above, this distinction between a fixed and mutable creative depends on how one wishes to treat them. It is not the case that a creative somehow has inherent properties that would classify it as fixed or mutable.

Upon receiving a creative, whether it be from the content audit system 30 or from the technical audit system 26, the queue manager 32 places it in one of possible several queues 34 for periodic re-inspection by the technical audit system 26. Such re-inspection is useful because a creative may have hidden technical attributes that manifest themselves only under certain circumstances. For example, there have been creatives that wait until late at night, when a computer is unlikely to be in use, before surreptitiously installing software. Such periodic re-inspection continues until the creative is eventually withdrawn from publication.

The queue manager 32 carries out two operations: adding a creative to the end of a specified queue 34 and returning the first available creative from a specified queue 34.

Each queue 34 has several attributes. For example, each queue 34 has a priority, which, in one practice, is selected from two different levels. Each queue 34 also has a loop value, which controls what happens when the last creative in the queue 34 is reached. In some cases, the queue 34 will jump back to its first creative. Such a queue 34 will therefore never end. In other cases, the queue 34 will test each creative a predetermined number of times, after which that creative is deleted from the queue 34.

In some practices, creatives are associated with historical data indicative of the inspection history of that creative. For example, the historical data may indicate that despite repeated inspections, the creative has consistently been found to lack any undesirable technical attributes. Because of its previous good behavior, it may be preferable to re-inspect such a creative less frequently. Or, the historical data may indicate that in previous inspections, a particular creative has been found to have one or more undesirable technical attributes. Because of this, it may be preferable to re-inspect such a creative more frequently.

The historical data associated with a creative can then be used to calculate a priority value for that creative and to periodically update that priority value in response to changes in the historical data. This dynamically adjusted priority value can then be used as a basis for deciding what order to inspect the creatives in a particular queue 34.

In systems that use priority values, it is no longer necessary to maintain several queues 34. This is because the priority value of the creatives within a single queue 34 effectively create as many virtual queues within that single queue 34 as there are priority values.

A variety of ways exist for calculating priority values. In one method, the priority value is given by setting priority modifiers and using those priority modifiers as weights. In one such method, the priority value is calculated using a product of priority modifiers:

$$\text{Priority\_value} = T^* \max(100, \text{product}(m_1, m_2, \ldots m_n))$$

where T is the elapsed time since the creative was last tested, "product" is a function that returns the product of its arguments, "max" is a function that returns the largest of its arguments, and the $m_i$ are priority modifiers associated with various properties of a creative.

For example, the priority modifier $m_1$ may be associated with the number of times a creative has been found to have an undesirable attribute. In some practices, $m_1=\min(1, \max(6 \text{ days}/T_1, 5))$, where $T_1$ is the elapsed time since an undesirable attribute was last found, "min" is a function that returns the smallest of its arguments, and "max" is as defined above. In this case, the creative would be tested up to five times more frequently for six days, after which the priority modifier slowly decreases to unity.

In other cases, it may be desirable to test third-party creatives more frequently. For example, if $m_2$ is a priority modifier associated with third party creatives, setting $m_2=3$ will result in third-party creatives being tested three times more often than non-third-party creatives.

In other cases, a particular publisher may wish to have creatives inspected more frequently or less frequently than other publishers regardless of any other attributes of the creative. In such a case, a priority modifier may be allocated to accommodate creatives that are to be tested more or less frequently. For example, a priority modifier such as $m_4$ can be set to a value greater than unity to increase the inspection frequency or less than unity to decrease the inspection frequency.

In other cases, it may be desirable to test creatives more frequently when they are new, and less frequently when they are older. A priority modifier such as $m_5$ could be allocated for such purposes. For example, $m_5$ could be set to a high value for all newly submitted creatives, and then reduced once the creative has been tested some predetermined number of times.

The periodic re-inspection of each creative builds confidence and increases the likelihood of detecting obscure behavior that might otherwise elude detection. Re-inspections also provide the opportunity to test creatives using proxy servers that mimic users 18 in other countries.

Figure 3:
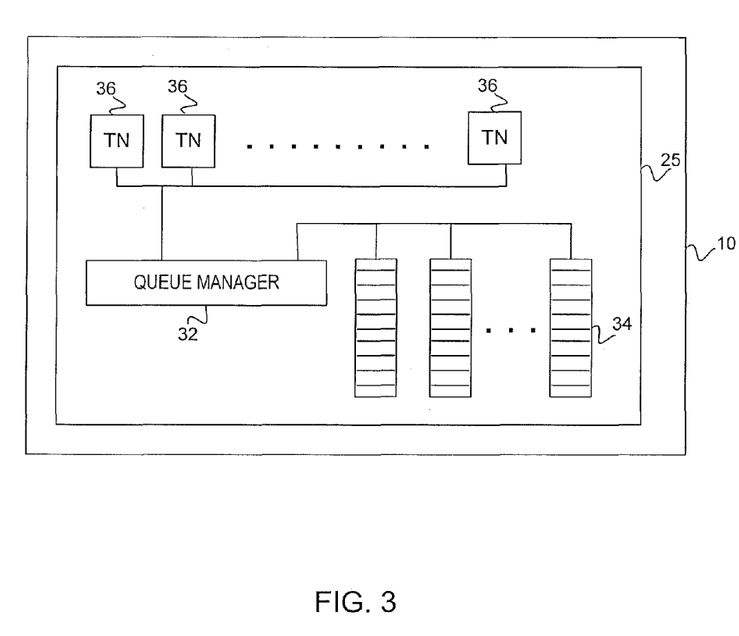
FIG. 3 shows test nodes executing on the media-exchange server of FIG. 1.

As shown in FIG. 3, the media exchange 10 of FIG. 1 includes a media-exchange server 25. The media-exchange server 25 stores both approved and candidate creatives 24 and also executes the technical audit system 26 for continually testing those creatives. The technical audit system 26 includes a number of test nodes 36, each of which is in communication with the queue manager 32. Each test node 36 receives creatives from the queue manager 32. Upon receiving a candidate creative 24, the test node 36 subjects the candidate creative 24 to a test suite.

The existence of a large number of test nodes 36 is useful for testing large numbers of creatives 24. The number of nodes is flexible. In some installations, there may be as few as ten test nodes 36 running in parallel. In other installations, there are as many as five-hundred test nodes 36 running in parallel. However, the optimal number of test nodes 36 depends primarily on expected processing load and on available hardware capacity.

Figure 4:
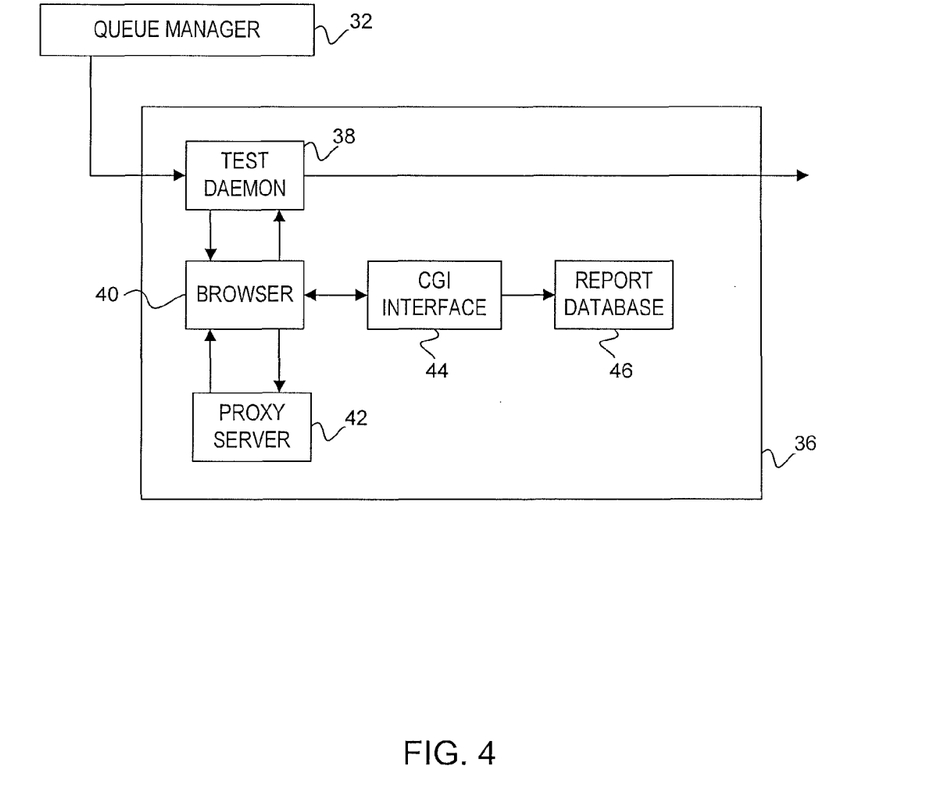
FIG. 4 shows a typical test node from FIG. 3.

Referring now to FIG. 4, each test node 36 includes a test daemon 38 for launching a fully-functional browser 40 and providing that browser 40 with a URL. The supplied URL causes the browser 40 to load a creative vector that contains the candidate creative 24.

A test node's browser 40 obtains its initial HTML code from a gateway specified by the queue 34 from which the candidate creative 24 was retrieved (i.e., the "originating" queue). In addition, the originating queue 34 can specify an external proxy, which enables that information from the gateway to be requested indirectly.

The test node 36 further includes a proxy-server 42 that filters requests from the browser 40 and processes any incoming information. A CGI ("Common Gateway interface") 44 provides communication between the browser 40 and a report database 46, in which are stored results of the test suite.

By loading the candidate creative 24 into a fully-functional browser 40 in communication with a proxy-server 42, the test node 36 can capture any hops through the internet that result from the loading of that candidate creative 24. In addition, the test node 36 has the opportunity to capture, record, and analyze each byte of data that passes to or from the browser 40. The existence of an actual browser window also enables the test node 36 to observe the creative's effect on browser window activity. This provides the test node 36 with an opportunity to observe additional pop-ups that may not otherwise have been detectable.

The constituents of the test node 36 cooperate to execute a test suite. Some test within the test suite are performed by the proxy-server 42 alone, whereas other tests can only be performed by the browser 40. Certain other tests, for example examination of a tag list, can be carried out only when information from preceding tests has been collected. Such tests are carried out by the test daemon 38.

The test suite begins with the test daemon 38 receiving, from the queue manager 32, a command that identifies the creative to be tested, together with the particular queue on which that creative can be found, and the appropriate gateway. The test daemon 38 provides this information to the proxy-server 42. The proxy-server 42 then rests its internal parameters and initiates corresponding records in the report database 46. It then waits for the test suite to begin.

Meanwhile, the test daemon 38 launches a browser 40 and provides it with a suitable argument for obtaining an instance of a creative vector containing the candidate creative 24. The browser 40 for a particular test node 36 has been configured to use a proxy-server 42 on a port unique to that test node 36.

Once the browser 40 launches, the test daemon 38 goes to sleep. It awakens again upon a normal termination of the test suite, for example by receiving a "window.close" command from the CGI interface 44. In some practices, the test daemon 38 maintains a timeout counter, in which case, upon occurrence of a timeout, the test daemon 38 awakens to send a kill signal to the browser 40.

The proxy-server 42 functions as an interface between the browser 40 and the internet. As a result, when a creative vector requests a creative, that creative must pass through the proxy-server 42 before the creative vector can load it. This allows the proxy-server 42 to carry out certain portions of the test suite on the creative before that creative is actually provided to the creative vector.

Figure 6:
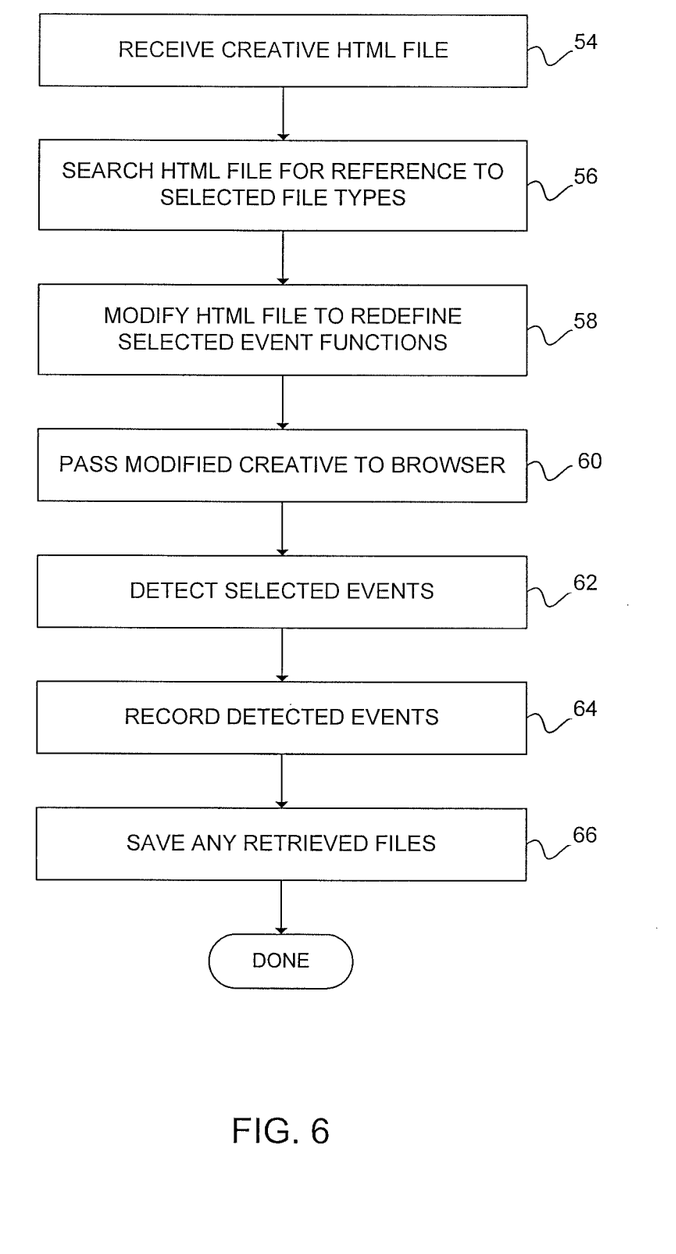
FIG. 6 is a flow-chart of a procedure carried out by the proxy-server.

FIG. 6 shows a portion of the test suite for the case in which the creative is an HTML file and the creative vector is a web page.

Referring now to FIG. 6, test suite includes receiving the HTML file that represents the requested creative (step 54), and searching that HTML file for any references to certain file types (step 56). These file types are selected to be those associated with certain functions that are likely to be forbidden. For example, there may be a search for references to animation files, audio files, executable files (for example EXE files), script files (for example .CAB files for active X scripts), and viruses. If any such references are found, information indicative of the references is written to the report database 46. In addition, those files are retrieved and stored in a cache (step 66).

The HTML file is then modified by redefining those functions that cause selected events to occur (step 58). Such functions, referred to as "event functions," include functions of opening and closing both conventional and pop-up windows, functions for re-sizing windows, and functions for opening and closing alert boxes. In most cases, the event functions are java-script functions. In one practice, the redefined java-script event functions are: window.open( ), window .alert( ), window.prompt( ), window.confirm( ), and window.close( ). The modified HTML file, with its redefined event functions, is passed to the browser 40 (step 60), which proceeds to load the creative.

Each redefined event function records information derived from its execution in the report database 46, and then proceeds to cause the event, just as it would have had it not be modified. For example, upon execution, a modified window-opening function (e.g. "Window.Open( )") would first write data to the report database 46. The data thus written would be indicative of the occurrence of a window opening event. Then, the modified window-opening function would proceed to open a window, just as it would have if it had not been modified.

The act of loading the creative may trigger the execution of certain event functions. However, because these event functions have been modified, the occurrence of their corresponding events will be recorded in the report database 46. This allows detection of the selected events (step 62) as well as the recordation of those events (step 64).

A suitable procedure, expressed in HTML, for carrying out a portion of the test suite is as follow:

```
<html>
<head>
<script type="text/javascript">
    var __proxy__new__id = 0;
    var __proxy__ie = (document.all);
    var __proxy__ns4 = (document.layers);
    var __proxy__ns6 = (document.getElementByld && !__proxy__ie);
    var __proxy__unit = __proxy__ns4? "" : "px";
    var __proxy__count__alerts = 0;
    var __proxy__main__timeout = [% main__timeout %]; /* seconds */
    var __proxy__delay__timeout = [% delay__timeout %]; /* seconds */
    var __proxy__closing = 0;
    window.proxy__old__open = window.open;
    window.proxy__old__alert = window.alert;
    window.proxy__old__prompt = window.prompt;
    window.proxy__old__confirm = window.confirm;
    window.proxy__old__close = window.close;
    window.close = function( ){
        __proxy__closing = 1;
        document.forms.__hidden__form__.submit( );
        setTimeout("window.opener =
            window;window.proxy__old__close( )",1000*30);
};
window.open = function(url,w__name,param) {
    if(__proxy__new__id > 9) {
        set__report__field("windows","<error>too many opened
            windows</error>\n");
        window.close( );
        return;
    }
    __proxy__new__id++;
    __proxy__url__tag = "<url>" + escape(url) + "</url>";
    __proxy__name__tag ="";
    __proxy__param__tag ="";
    __open__ = "~~~open~~~";
    if(__proxy__closing)__open__= "~~~open-on-exit~~~";
    if(w__name)__proxy__name__tag = "<name>" + w__name + "</name>";
    if(param)__proxy__param__tag = "<param>" + param + "</param>";
    if(url.indexOf("?") == -1)url += "?";
    url +=__open__;
set__report__field("windows","<window>"+__proxy__url__tag+__proxy__name__tag+__proxy__param__tag+"</window>\n");
    var out;
    if(url && w__name && param) {
        out = window.proxy__old__open(url,w__name,param);
    } else {
        if(url && w__name && !param) {
            out = window.proxy__old__open(url,w__name);
        } else {
            out = window.proxy__old__open(url);
        }
    }
//  var old__document__write = out.document.write;
    return(out);
};
window.alert = function(msg){
    set__report__field("windows","<alert>" + msg + "</alert>\n");
    __proxy__count__alerts++;
    if(__proxy__count__alerts > 10)window.close ( );
};
window.prompt = function(msg,def) {
    set__report__field("windows","<prompt>" + def + "</prompt>\n");
```

-continued

```
        __proxy__count__alerts ++;
        if(__proxy__count__alerts > 10)window.close( );
        return def;
    };
    window.confirm = function(msg) {
        set__report__field("windows", "<confirm>" +msg + "</confirm>\n");
        __proxy__count__alerts++;
        if(__proxy__count__alerts > 10)window.close ( );
        return true;
    };
    function set__report__field(field,msg){
        var hidden__form = document.forms.__hidden__form__;
        if(hidden__form){
            hidden__form.elements[field].value += msg;
        }
    }
}
/* setTimeout("window.close( )", 180*1000); close in any case*/ </script> </head> <body> <div
id="proxy__wrapper"
style="position:absolute;width: 100%;height:100%;top:0px;left:0px;font-si
ze:26;font-weight:bold;color:yellow">
    <p>Proxy wrapper ID = [% proxy__id %] </div>
        <form name="__hidden__form__"method="POST" action="[% action %]">
            <input name="proxy__id" type="hidden" value="[% proxy__id %]"></input>
            <input name="creative__id" type="hidden" value="[% creative__id %]"></input>
            <input name="test__pass" type="hidden" value="[% test__pass %]"></input>
            <input name="test__id" type="hidden" value="[% test__id %]"></input>
            <input name="report__id" type="hidden" value="[% report__id %]"><input>
            <input name="size__id" type="hidden" value="[% size__id %]"></input>
            <input name="queue__name" type="hidden" value="[% queue__name %]"></input>
            <input name="images" type="hidden"></input>
            <input name="url" type="hidden"></input>
            <input name="referer" type="hidden"></input>
            <input name="frames" type="hidden"></input>
            <input name="objects" type="hidden"></input>
            <input name="links__count" type="hidden" value="0"></input>
            <input name="forms__count" type="hidden" value="0"></input>
            <input name="windows" type="hidden" ></input>
            <input name="time" type="hidden" value="[% time %]"></input>
            [% is__test %]
        </form>
[% html__document %]
</body>
<script type="text/javascript">
    if(__proxy__ns6) {
        function__document__load(str) {
            document.readyState = 'complete';
            if(window.proxy__old__onload)window.proxy__old__onload( );
        }
        Document.prototype.readyState = 0;
        window.proxy__old__onload = window.onload;
        window.onload = __document__load;
    }
    var __proxy__images = document.getElementsByTagName('img');
    var __proxy__objects = document.getElementsByTagName('object');
    var __proxy__links = document.getElementsByTagName('a');
    var __proxy__forms = document.getElementsByTagName('form');
    var __proxy__frames = document.getElementsByTagName('iframe');
    var __proxy__wait = 0;
    function wait__images( ){
    __proxy__wait++;
        if((document.readyState != 'complete') && (__proxy__wait <=
__proxy__main__timeout))setTimeout("wait__images( )",1000);
        else {
            setTimeout("window.close( )", 1000*__proxy__delay__timeout);
            return;
        }
    }
    var __proxy__txt = "";
    for(i=0;i<__proxy__images.length;i++){
        img = __proxy__images[i];
        __proxy__txt += "<image>" + escape(img.src) + "</image>\n";
    }
    set__report__field("images",__proxy__txt);
    __proxy__txt="";
    for(i=0;i<__proxy__objects.length;i++) {
        object = __proxy__objects[i];
        __proxy__txt += "<object>";
        if(object.type)__proxy__txt += "<type>" + object.type + "</type>";
        if(object.data)__proxy__txt += "<data>" + escape(object.data) + "</data>";
        if(object.codeBase)__proxy__txt += "<codebase>" +
```

```
escape(object.codeBase) + "</codebase>";
    if(__proxy__ie) {
            __proxy__txt += "<baseurl>" + escape(object.BaseHref) + "</baseurl>";
            if(object.Movie)__proxy__txt += "<movie>" +
escape(object.Movie) + "</movie>";
    {
    else {
        __proxy__txt +="<baseurl>" + escape(object.baseURI) + "</baseurl>";
        for(j=0;j<object.childNodes.length;j++){
            child = object.childNodes[j];
                if(child.name && child.value) {
                    if(child.name.match(/_movie$/i)) {
                    __proxy__txt += "<movie>" + escape(child.value) + "</movie>";
                    break;
                }
            }
        }
    }
    __proxy__txt += "</object>\n";
    }
    set__report__field("objects",__proxy__txt);
    __proxy__txt = ""
    for(i=0,j=1;i<__proxy__frames.length;i++){
        frame = __proxy__frames[i];
        src = frame.src;
        __proxy__txt += "<iframe>" + escape(src) + "</iframe>\n";
    }
    set__report__field("frames",__proxy__txt);
    set__report__field("url",escape(document.URL));
    set__report__field("referer",escape(document.referer));
    var__proxy__count = 0;
    for(i=0;i<__proxy__links.length;i++){
        link = __proxy__links[i];
        if(link.href) __proxy__count++;
        }
        set__report__field("links__count",__proxy__count);
        set__report__field("forms__count",__proxy__forms.length-1);
        wait__images( );
</script>
</html>
```

Upon completion of the test suite, the test daemon 38 further provides an output instruction to control disposition of the candidate creative 24. For example, if the candidate creative 24 fails the test suite, the test daemon 38 instructs the mailer 28 to send a rejection message 30. Otherwise, the test daemon 38 either passes the creative 24 back to the queue manager 32 or, if necessary, to the content audit system 30.

Figure 5:
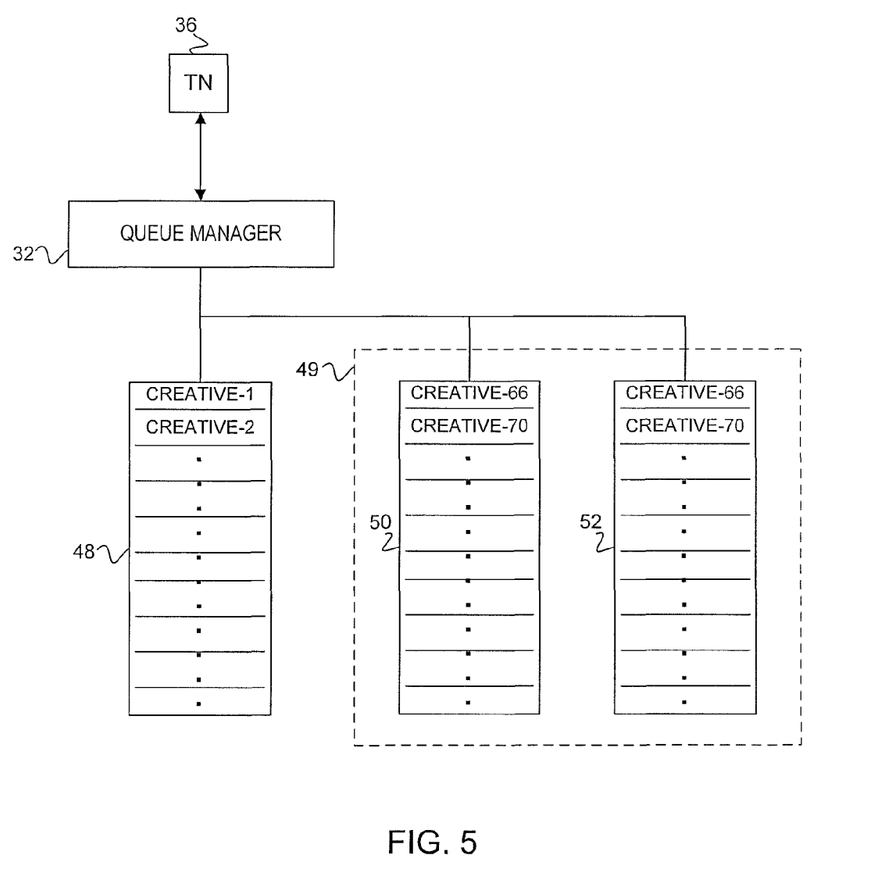
FIG. 5 shows two queue types from the queues shown in FIG. 3.

Referring now to FIG. 5, the queue manager 32 handles two types of queues: a single queue 48 and a hybrid queue 49. A first set of test nodes 36 serves the single queues 48, and a second set of test nodes 36 serves the hybrid queues 49. In one practice, there are five test nodes 36 in the first set and five different test nodes 36 in the second set, so that each test node 36 serves either the single queues 48 or the hybrid queues 49, but not both.

In one particular embodiment, the single queue 48 is a low-priority queue that holds as many as 16,000 creatives. In addition, the time-out set for creatives in the single queue 48 is high, as much as five minutes. With so many creatives, and such a high time-out value, the residence time in the single queue 48 can be as high as 24 hours. Thus, the single queue 48 is used primarily for the periodic re-inspection of those creatives that have been initially approved. However, the time-out values and the particular queue capacities may be changed depending on the requirements imposed by a particular application.

Once a creative is placed on a single queue 48, it remains there until it is explicitly recalled. After the queue manager 32 sends the last creative to the test nodes 36 for processing, it returns to the first creative on the queue 48 and sends that first creative to the test nodes. Thus, the single queue 48 can be regarded as an endless queue. Once a creative is on the single queue 48, it is re-inspected multiple times until it is explicitly removed from the queue 48, for example in response to instructions from an advertiser 14 who no longer wishes to use that creative.

The hybrid queue 49 is in fact a logical reference to a pair of queues, one of which is high-priority 50 and the other of which is a low-priority queue 52. When a creative is placed in the hybrid queue 49, it is in fact placed in both queues 50, 52 at the same time. The creative placed in the high-priority queue 50 is slated to receive only one run through the test suite, with a time-out period of only twenty seconds. The creative placed in the low-priority queue 52 is slated to receive ten runs through the test suite, with a time-out period of 300 seconds. The time-out periods set forth are exemplary only. Embodiments of the system described herein can have other time-out periods depending on the particular requirements of an application.

The hybrid queue 49 enables the advertiser 14 to obtain fairly quick initial results for a new and untested creative 24. In practice, a creative placed on a high-priority queue 50 can interrupt any test node 36 that is testing a creative from a low-priority queue 52. Only if all five test nodes 36 are busy testing creatives from high-priority queues 50 will a new creative 24 have to wait until a test node 36 is free.

Having described the invention, and a preferred embodiment thereof, what we claim as new, and secured by Letters Patent is:

1. A computer-implemented method for testing a plurality of candidate creatives, the method comprising:
   placing, by a media exchange server, the plurality of candidate creatives on a queue coupled with the media exchange server configured to interface prospective buyers and sellers of the candidate creatives;
   inspecting, by the server, technical attributes of each candidate creative when at a front of the queue with at least one test node before delivery to a publisher, wherein inspecting comprises the server:
      generating a creative vector containing the candidate creative;
      launching a browser by a test daemon of the at least one test node;
      loading the creative vector into the browser; and
      executing a test suite on the candidate creative by constituent elements of the test node;
   determining, by the server, that a first of the candidate creatives is a fixed creative comprising constituent elements that do not change each time a creative vector thereof is loaded into a browser;
   delivering, by the server, the fixed candidate creative directly to the publisher from the server;
   re-inspecting, by the server, the technical attributes of a second of the candidate creatives that remain in the queue after one or more previous inspections by the server, comprising detecting a hidden technical attribute detectable under unknown specified circumstances; and
   rejecting delivery of the second candidate creative to the publisher by the server as a result of detecting the hidden technical attribute.

2. The method of claim 1, further comprising:
   authorizing the first candidate creative for release based on results of inspecting the technical attributes; and
   detecting a flag to not re-inspect the fixed candidate creative based on the fixed candidate creative remaining unchanged.

3. The method of claim 1, wherein inspecting a technical attribute further comprises capturing, recording, and analyzing each byte of data that passes to or from the browser.

4. The method of claim 3, wherein inspecting a technical attribute further comprises:
   providing a proxy-server coupled with the server for communication with the browser; and
   performing, by the proxy server, portions of the test suite on each candidate creative before the creative is provided to the creative vector in the browser.

5. The method of claim 4, wherein each creative comprises an HTML file and the creative vector comprises a web page, wherein performing portions of the test suite by the proxy server comprises:
   receiving an HTML file that represents a requested candidate creative;
   searching the HTML file for references to certain file types associated with functions that are likely to be unauthorized;
   retrieving any files of the certain file types that are found;
   modifying the HTML file to redefine selected event functions, wherein each redefined event function records information derived from its execution in a report database upon execution; and
   loading the modified HTML file into the browser.

6. The method of claim 5, further comprising:
   writing information indicative of the references to the report database.

7. The method of claim 5, further comprising:
   detecting selected events upon execution due to the modifications to the HTML file;
   recording the detected events in the report database; and
   saving retrieved files in a cache.

8. The method of claim 1, wherein the queue comprises an endless queue for repeated re-inspection.

9. The method of claim 1, wherein placing the plurality of candidate creatives on the queue comprises placing the candidate creatives on both a low-priority queue and on a high-priority queue, wherein priority is determined based on historical data comprising data indicating whether or not the candidate creatives have been associated with undesirable technical attributes.

10. The method of claim 9, wherein placing the candidate creatives on a low-priority queue comprises placing the candidate creatives on an endless queue.

11. The method of claim 1, wherein placing the candidate creatives on the queue comprises
   associating historical data with the candidate creatives, the historical data comprising data indicating whether or not the candidate creatives have been associated with undesirable technical attributes; and
   calculating a priority value for each candidate creative at least in part on the basis of the historical data.

12. A computer-implemented method for testing a plurality of candidate creatives, the method comprising:
   placing, by a media exchange server, the plurality of candidate creatives on a queue coupled with the media exchange server configured to interface prospective buyers and sellers of the candidate creatives;
   inspecting, by the server, technical attributes of each candidate creative when at a front of the queue with at least one test node before delivery to a publisher, wherein inspecting comprises the server:
      generating a creative vector containing the candidate creative;
      launching a browser by a test daemon of the at least one test node;
      loading the creative vector into the browser; and
      executing a test suite on the candidate creative by constituent elements of the test node;
   determining, by the server, that one of the candidate creatives is a mutable creative comprising constituent elements that are changeable each time a creative vector thereof is loaded into a browser, at least some of the changeable constituent elements being stored at a location other than on the server; and
   re-inspecting, by the server, the technical attributes of the mutable creative that remains in the queue after one or more previous inspection by the server, comprising detecting a hidden or changed technical attribute detectable under unknown specified circumstances; and
   rejecting delivery of the mutable creative to the publisher by the server as a result of detecting the hidden or changed technical attribute.

13. The method of claim 12, wherein the creative vector comprises a web page, wherein inspecting a technical attribute comprises:
   detecting an interaction between the candidate creative and the browser.

14. The method of claim 13, wherein detecting an interaction comprises detecting an attempt to alter a state of a window associated with the browser.

15. The method of claim 13, wherein detecting an interaction comprises detecting an attempt to cause the browser to open a window.

16. The method of claim 13, wherein detecting an interaction comprises detecting a new window.

17. The method of claim 12, wherein inspecting a technical attribute further comprises:
  determining that the creative includes an instruction to reference a file;
  determining a property associated with the file; and
  providing information indicative of the property.

18. The method of claim 17, wherein determining a property comprises determining a type of the file.

19. The method of claim 17, wherein determining a property comprises determining a size of the file.

20. A non-transitory computer-readable medium having encoded thereon software for testing a plurality of candidate creatives, the software comprising instructions to direct a processor to:
  place the plurality of candidate creatives on a queue coupled with a media exchange server configured to interface prospective buyers and sellers of the candidate creatives;
  inspect technical attributes of each candidate creative when at a front of the queue with at least one test node before delivery to a publisher, wherein inspecting comprises:
    generating a creative vector containing the candidate creative;
    launching a browser by a test daemon of the at least one test node;
    loading the creative vector into the browser; and
    executing a test suite on the candidate creative by constituent elements of the test node;
  determine that a first of the candidate creatives is a fixed creative comprising constituent elements that do not change each time a creative vector thereof is loaded into a browser;
  deliver the fixed candidate creative directly to the publisher;
  re-inspect the technical attributes of a second of the candidate creatives that remains in the queue after one or more previous inspections comprising detecting a hidden technical attribute detectable under unknown specified circumstances; and
  reject delivery of the second candidate creative to the publisher as a result of detecting the hidden technical attribute.

21. The computer readable medium of claim 20, further comprising instructions comprising to detect a flag to not re-inspect the fixed candidate creative based on the fixed candidate creative remaining unchanged.

22. A non-transitory computer-readable medium having encoded thereon software for receiving creatives from advertisers and distributing creatives to publishers, the software including instructions for causing a computer system to:
  define a queue for holding creatives;
  implement a technical audit system for periodically inspecting technical attributes of the creatives as the creatives are rotated through the queue to find a hidden technical attribute detectable under unknown specified circumstances before delivery thereof to a publisher, wherein the instructions for implementing the technical audit system comprise instructions for:
    implementing a test node configured to cause execution of a browser for loading a creative vector containing a creative;
    generating the creative vector containing the candidate creative;
    launching the browser by a test daemon of the test node;
    loading the creative vector into the browser; and
    executing a test suite on the candidate creative by constituent elements of the test node;
  implement a content audit system for receiving fixed creatives from the technical audit system, the fixed creatives comprising constituent elements that do not change each time a creative vector thereof is loaded into the browser, wherein the content audit system classifies creatives according to content attributes thereof;
  delivering the fixed candidate creatives directly to the publisher from the server; and
  detecting a flag to not re-inspect the fixed candidate creatives based on the fixed candidate creatives remaining unchanged.

23. The computer-readable medium of claim 22, wherein the instructions for implementing the test node include instructions that causes execution of a proxy-server coupled with the computer system for communicating with the browser, wherein the proxy server performs portions of the test suite on each candidate creative before the creative is provided to the creative vector in the browser.

24. The computer-readable medium of claim 22, wherein the instructions for defining a queue comprise instructions for defining an endless queue.

25. The computer-readable medium of claim 22, wherein the instructions for defining a queue comprise instructions for defining a hybrid queue having a low-priority queue and a high-priority queue, the hybrid queue being configured to enqueue a creative in both the low-priority queue and the high-priority queue.

26. A data-processing system for testing candidate creatives, the system comprising:
  a processor including test nodes;
  a memory in data communication with the processor;
  a storage in data communication with the processor and the memory, the storage having encoded thereon software to direct the processor to:
    inspect technical attributes of the each candidate creative with at least one test node before delivery to a publisher, wherein inspecting comprises:
      generating a creative vector containing the candidate creative;
      launching a browser by a test daemon of the at least one test node;
      loading the creative vector into the browser; and
      executing a test suite on the candidate creative by constituent elements of the test node;
    determine that a candidate creative is a mutable creative comprising constituent elements that are changeable each time a creative vector thereof is loaded into a browser, at least some of the changeable constituent elements being stored at a location other than the storage subsystem;
    enqueue the candidate creative for periodic re-inspection of the technical attribute to find hidden or changed technical attributes detectable under unknown specified circumstances; and
    reject delivery of the mutable creative to the publisher by the server as a result of detecting the hidden or changed technical attribute.

27. A non-transitory computer-readable medium having encoded thereon software for testing a candidate creative, the software comprising instructions executable by a processor for:
  inspecting technical attributes of the candidate creative with at least one test node having a test daemon before delivery to a publisher, wherein inspecting comprises:

generating a creative vector containing the candidate creative;
launching a browser by a test daemon of the at least one test node;
loading the creative vector into the browser; and
executing a test suite on the candidate creative by constituent elements of the test node;

determining that the candidate creative is a mutable creative comprising constituent elements that are changeable each time a creative vector thereof is loaded into a browser; and queuing the candidate creative for periodic re-inspection of the technical attribute attributes to find a technical hidden or changed attribute detectable under unknown specified circumstances; and rejecting delivery of the candidate creative to the publisher as a result of detecting the hidden technical attribute.

\* \* \* \* \*